United States Patent
Ikushima

(10) Patent No.: US 8,397,955 B2
(45) Date of Patent: Mar. 19, 2013

(54) LIQUID MATERIAL DISCHARGE DEVICE WITH DEBUBBLING MECHANISM

(75) Inventor: Kazumasa Ikushima, Mitaka (JP)

(73) Assignee: Musashi Engineering, Inc., Mitaka-shi, Tokyo (JP)

( * ) Notice: Subject to any disclaimer, the term of this patent is extended or adjusted under 35 U.S.C. 154(b) by 1165 days.

(21) Appl. No.: 12/279,897

(22) PCT Filed: Feb. 19, 2007

(86) PCT No.: PCT/JP2007/052947
§ 371 (c)(1),
(2), (4) Date: Oct. 21, 2008

(87) PCT Pub. No.: WO2007/097277
PCT Pub. Date: Aug. 30, 2007

(65) Prior Publication Data
US 2010/0224071 A1  Sep. 9, 2010

(30) Foreign Application Priority Data
Feb. 21, 2006 (JP) .................................. 2006-044483

(51) Int. Cl.
*B01D 19/00* (2006.01)
(52) U.S. Cl. ............ 222/422; 222/380; 222/190; 96/194
(58) Field of Classification Search ............... 222/380, 222/420, 422, 190; 96/194
See application file for complete search history.

(56) References Cited

U.S. PATENT DOCUMENTS
2,850,990 A * 9/1958 Rasmusson .................... 222/135
3,559,644 A * 2/1971 Stoft et al. ..................... 604/123
(Continued)

FOREIGN PATENT DOCUMENTS
EP  0608129 A1  7/1994
EP  1439006 A1  7/2004
(Continued)

OTHER PUBLICATIONS

European Search Report dated Nov. 11, 2009, issued in corresponding European Patent Application No. 07714473.1.
(Continued)

*Primary Examiner* — J. Casimer Jacyna
(74) *Attorney, Agent, or Firm* — Westerman, Hattori, Daniels & Adrian, LLP

(57) ABSTRACT

A liquid material discharge device which can remove bubbles in a liquid material supplied to the device, can ensure a stable discharge amount of the liquid material, and can reduce the weight of a plunger section. The liquid material discharge device comprises a liquid material supply section for supplying the liquid material to be discharged, a measuring section having a measuring hole and a plunger sliding on an inner wall surface of the measuring hole to suck the liquid material into the measuring hole and to discharge the liquid material, a discharge section having a discharge port for discharging the liquid material, a valve section for changing over communication between the liquid material supply section and the measuring section and communication between the measuring section and the discharge section, and a debubbling mechanism provided in a flow path running from the liquid material supply section to the measuring section. The debubbling mechanism includes a first flow path (4) communicating with the liquid material supply section side, a second flow path (5) communicating with the measuring section side, and a body (3) for making the first flow path and the second flow path communicate with each other, the body having a greater width than the first flow path. A discharge port (6) of the first flow path is located above a suction port (7) of the second flow path.

5 Claims, 11 Drawing Sheets

U.S. PATENT DOCUMENTS

| | | | | |
|---|---|---|---|---|
| 4,054,522 A * | 10/1977 | Pinkerton | ............... | 210/188 |
| 5,127,547 A * | 7/1992 | Gerich | ............... | 222/55 |
| 5,290,340 A * | 3/1994 | Gatten et al. | ............... | 95/46 |
| 5,529,099 A * | 6/1996 | Janek et al. | ............... | 141/129 |
| 5,569,208 A * | 10/1996 | Woelpper et al. | ............ | 604/183 |
| 5,853,456 A * | 12/1998 | Bryan et al. | ............... | 95/30 |
| 6,309,692 B1 | 10/2001 | Nakamura et al. | | |
| 6,589,791 B1 | 7/2003 | LaBudde et al. | | |
| 7,182,106 B2 * | 2/2007 | Misu et al. | ............... | 141/4 |
| 7,357,280 B2 * | 4/2008 | Nishinomiya et al. | ........ | 222/252 |
| 2002/0001675 A1 | 1/2002 | Tisone | | |
| 2005/0063839 A1 | 3/2005 | Kazumasa | | |
| 2005/0067438 A1 | 3/2005 | Ikushima | | |

FOREIGN PATENT DOCUMENTS

| | | |
|---|---|---|
| JP | 04-070838 A | 3/1992 |
| JP | 9-192568 A | 7/1997 |
| JP | 10-307051 A | 11/1998 |
| JP | 2001-029465 A | 2/2001 |
| JP | 2003-093942 A | 4/2003 |
| JP | 2003-190871 A | 7/2003 |
| JP | 2006-043584 A | 2/2006 |
| WO | 97/20612 A1 | 6/1997 |

OTHER PUBLICATIONS

International Search Report of PCT/JP2007/052947, date of mailing Apr. 24, 2007.

* cited by examiner (a)　　　　　　　(b)　　　　　　　(c)

(d)　　　　　　　(e)　　　　　　　(f)

(a)

(b)

(c)

(d)

(e)

(f)

(a)　　　　　　　　(b)

LIQUID MATERIAL DISCHARGE DEVICE WITH DEBUBBLING MECHANISM

TECHNICAL FIELD

The present invention relates to a device for discharging a liquid material by dripping or flying it in the form of droplets. More particularly, the present invention relates to a liquid material discharge device which can accurately discharge a liquid material in a certain fixed amount in a clean state through a nozzle without mixing bubbles into the liquid material.

The term "discharge" used in the present invention includes discharge of the type that the liquid material contacts a workpiece before the liquid material departs from the nozzle, and discharge of the type that the liquid material contacts a workpiece after the liquid material has departed from the nozzle.

BACKGROUND ART

If bubbles come into a measuring section of a liquid material discharge device, the movement of a plunger cannot be precisely transmitted to a liquid material and the liquid material cannot be discharged with high accuracy.

As one example of a debubbling mechanism for the liquid material discharge device, the applicant has developed a liquid material discharge device in which a debubbling hole is formed in a plunger head (Patent Document 1).

In the device described in Patent Document 1, an ordinary discharge operation is performed in a state where an upper larger-diameter portion of a valve rod is slidably fitted to an upper inner space of a plunger rod, and a top surface of the valve rod is fixedly pressed by a setting screw that is screwed to a plunger support. On the other hand, a debubbling operation is performed by loosening the setting screw that presses the top surface of the valve rod.

Patent Document 1: Japanese Patent Laid-Open No. 2003-190871

DISCLOSURE OF THE INVENTION

Problems to be Solved by the Invention

In the debubbling mechanism of the prior art, a flow path and a valve mechanism are provided within a plunger section, and hence the plunger has a complicated structure. Such a complicated structure raises a difficulty in reducing the weight of the plunger section in spite of a demand for faster operation.

In view of the above-described problems in the art, an object of the present invention is to provide a liquid material discharge device which can remove bubbles in a liquid material supplied to the device, can ensure a stable discharge amount of the liquid material, and can reduce the weight of a plunger section.

Means for Solving the Problems

To solve the above-described problems and achieve the above-described object, the liquid material discharge device of the present invention is constituted as follows.

According to a first aspect, the present invention provides a liquid material discharge device comprising a liquid material supply section for supplying the liquid material to be discharged, a measuring section having a measuring hole and a plunger sliding on an inner wall surface of the measuring hole to suck the liquid material into the measuring hole and to discharge the liquid material, a discharge section having a discharge port for discharging the liquid material, a valve section for changing over communication between the liquid material supply section and the measuring section and communication between the measuring section and the discharge section, and a debubbling mechanism provided in a flow path running from the liquid material supply section to the measuring section, wherein the debubbling mechanism includes a first flow path (4) communicating with the liquid material supply section side, a second flow path (5) communicating with the measuring section side, and a body (3) for making the first flow path and the second flow path communicate with each other, the body having a greater width than the first flow path, and a discharge port (6) of the first flow path is located above a suction port (7) of the second flow path.

According to a second aspect, in the first aspect of the present invention, the discharge port (6) of the first flow path is laterally disposed in the body (3).

According to a third aspect, in the first or second aspect of the present invention, the discharge port (6) of the first flow path is extended to the interior of the body (3).

According to a fourth aspect, in any one of the first to third aspects of the present invention, the suction port (7) of the second flow path is laterally disposed in the body (3).

According to a fifth aspect, in any one of the first to fourth aspects of the present invention, the suction port (7) of the second flow path is extended to the interior of the body (3).

According to a sixth aspect, in any one of the first to fifth aspects of the present invention, the body (3) is made of a transparent material.

According to a seventh aspect, in any one of the first to sixth aspects of the present invention, the valve section has a first position in which the liquid material supply section and the measuring section are communicated with each other and the communication between the measuring section and the discharge section is cut off, and a second position in which the measuring section and the discharge section are communicated with each other and the communication between the measuring section and the liquid material supply section is cut off.

According to an eighth aspect, in any one of the first to sixth aspects of the present invention, the valve section comprises a first valve for making the debubbling mechanism and the measuring section communicate with each other and a second valve for making the liquid material supply section and the debubbling mechanism communicate with each other, the first valve having a first position in which the communication between the measuring section and the discharge section is cut off, and a second position in which the measuring section and the discharge section are communicated with each other, the second valve having a first position in which the debubbling mechanism and the liquid material supply section are communicated with each other, and a second position in which the communication between the debubbling mechanism and the liquid material supply section is cut off.

According to a ninth aspect, in any one of the first and third to eighth aspects of the present invention, the discharge port (6) of the first flow path is disposed at an upper level in the body.

According to a tenth aspect, in any one of the first to third and fifth to ninth aspects of the present invention, the suction port (7) of the second flow path is disposed at a lower level in the body.

According to an eleventh aspect, in any one of the first to tenth aspects of the present invention, at least one of the first flow path (4) and the second flow path (5) is formed of a tube.

According to a twelfth aspect, in any one of the first to eleventh aspects of the present invention, the debubbling mechanism includes communication means for selectively establishing or cutting off communication between the interior and the exterior of a debubbling mechanism body.

According to a thirteenth aspect, in any one of the first to twelfth aspects of the present invention, a volume of the debubbling mechanism body is set to be greater than that of the measuring section.

According to a fourteenth aspect, in any one of the first to thirteenth aspects of the present invention, the plunger is retracted in a state of the liquid material supply section and the measuring section being communicated with each other to such an extent that a liquid surface of the liquid material within the debubbling mechanism body does not lower down to the suction port (7) of the second flow path, thereby sucking the liquid material into the measuring hole, and the plunger is advanced in a state of the measuring section and the discharge section being communicated with each other, thereby discharging the liquid material.

Effects of the Invention

With the present invention, the plunger section has a simpler construction, which contributes to reducing the weight of the plunger section that is operated at a high speed for applying a pressure to the liquid material. Therefore, reliable operation of the plunger can be ensured.

Further, the debubbling mechanism has a simple structure without requiring a driving mechanism. This feature also contributes to reducing the weight of the device in addition to the simpler construction of the plunger.

DESCRIPTION OF REFERENCE CHARACTERS

Figure 1:
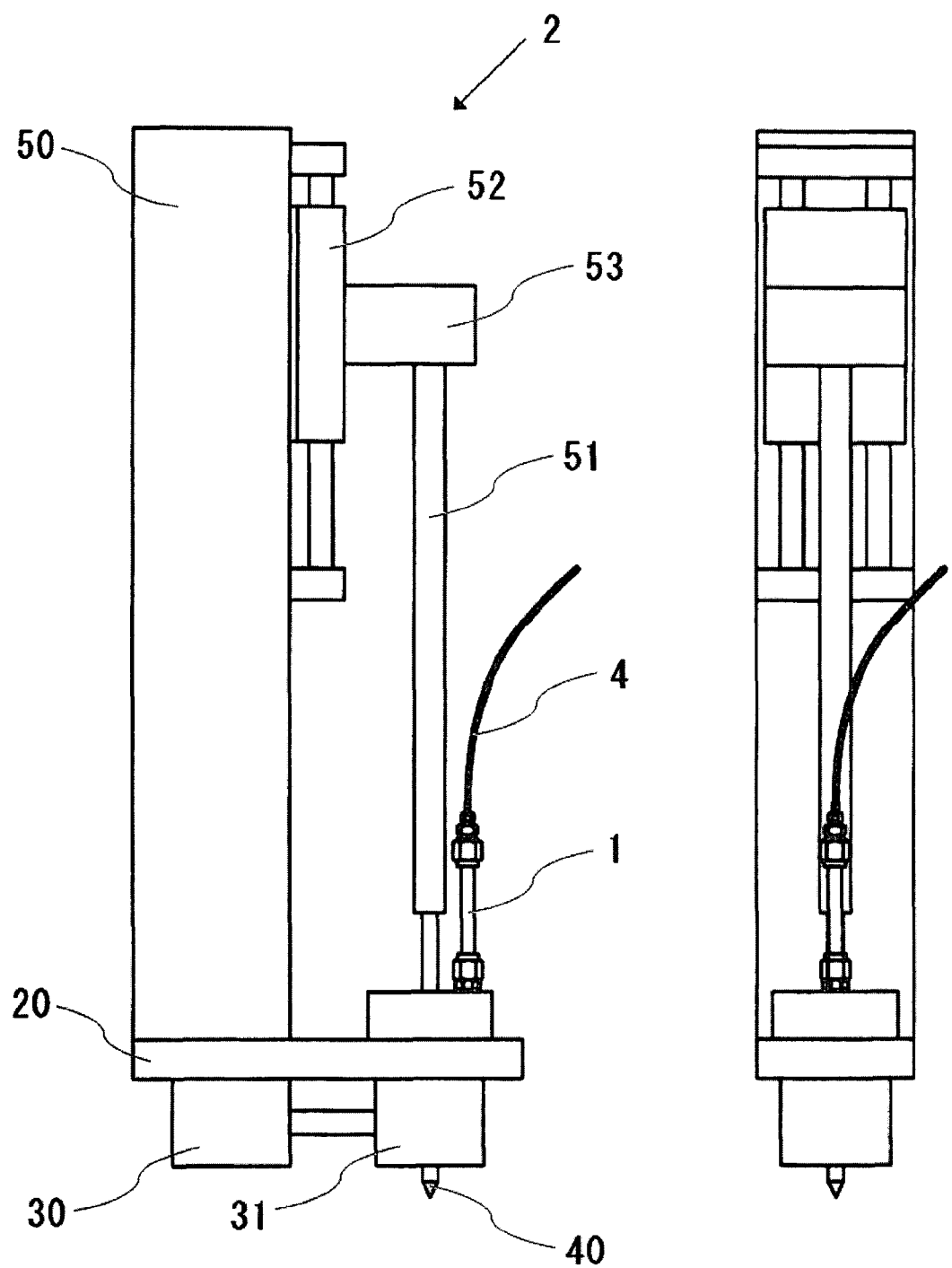
FIG. 1 is a front view and a side view showing an external appearance of a discharge device according to an embodiment of the present invention.

A legend of main reference characters used in the drawings is as follows:

1 debubbling mechanism/2 device body/3 body of debubbling mechanism/4 first tube/5 second tube/6 discharge port of first tube/7 suction port of second tube/8 liquid surface/9 space/10 bubble/11 unwanted material/20 base/30 valve driving section/31 valve/32 valve member/33 measuring section/34 through hole of valve member/35 second valve/36 second valve driving section/37 intermediate plate/40 nozzle/50 plunger driving section/51 plunger/52 slider/53 plunger support/70 3-axis robot/71 liquid material reservoir/72 regulator/73 pressurizing tube/74 under-pressure feed tube/75 table/76 workpiece/80 communication means/81 spring/82 through hole/83 pressing portion/84 shaft portion/85 valve member/86 valve seat

BEST MODE FOR CARRYING OUT THE INVENTION

As shown in FIG. 1, a debubbling mechanism 1 used in a discharge device of the present invention is disposed in a liquid material supply section of a device body 2.

Figure 2:
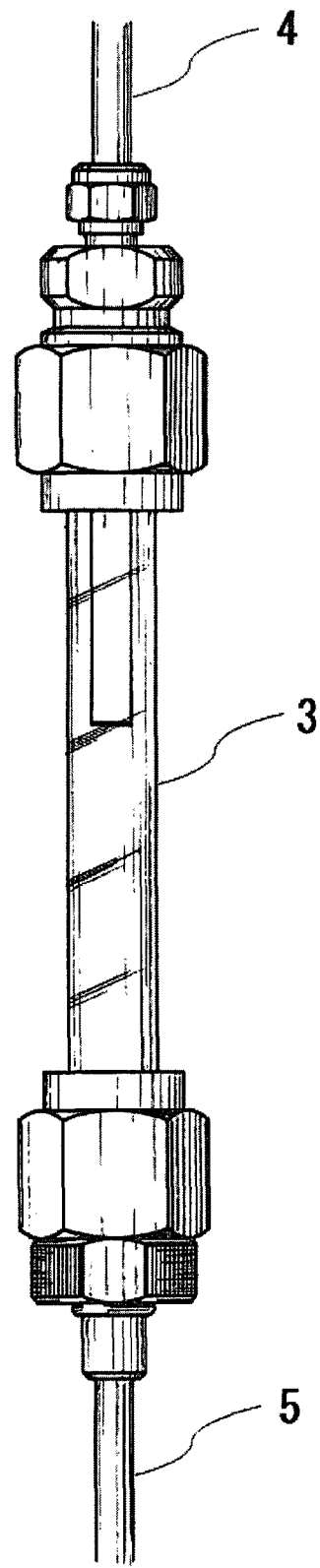
FIG. 2 is an enlarged front view of a debubbling mechanism in the device shown in FIG. 1.

As shown in FIG. 2, the debubbling mechanism 1 according to the present invention mainly comprises a debubbling mechanism body 3 having a tubular shape, a first tube 4 extending from above the debubbling mechanism body 3 to the interior thereof, and a second tube 5 disposed below the debubbling mechanism body 3.

Figure 3:
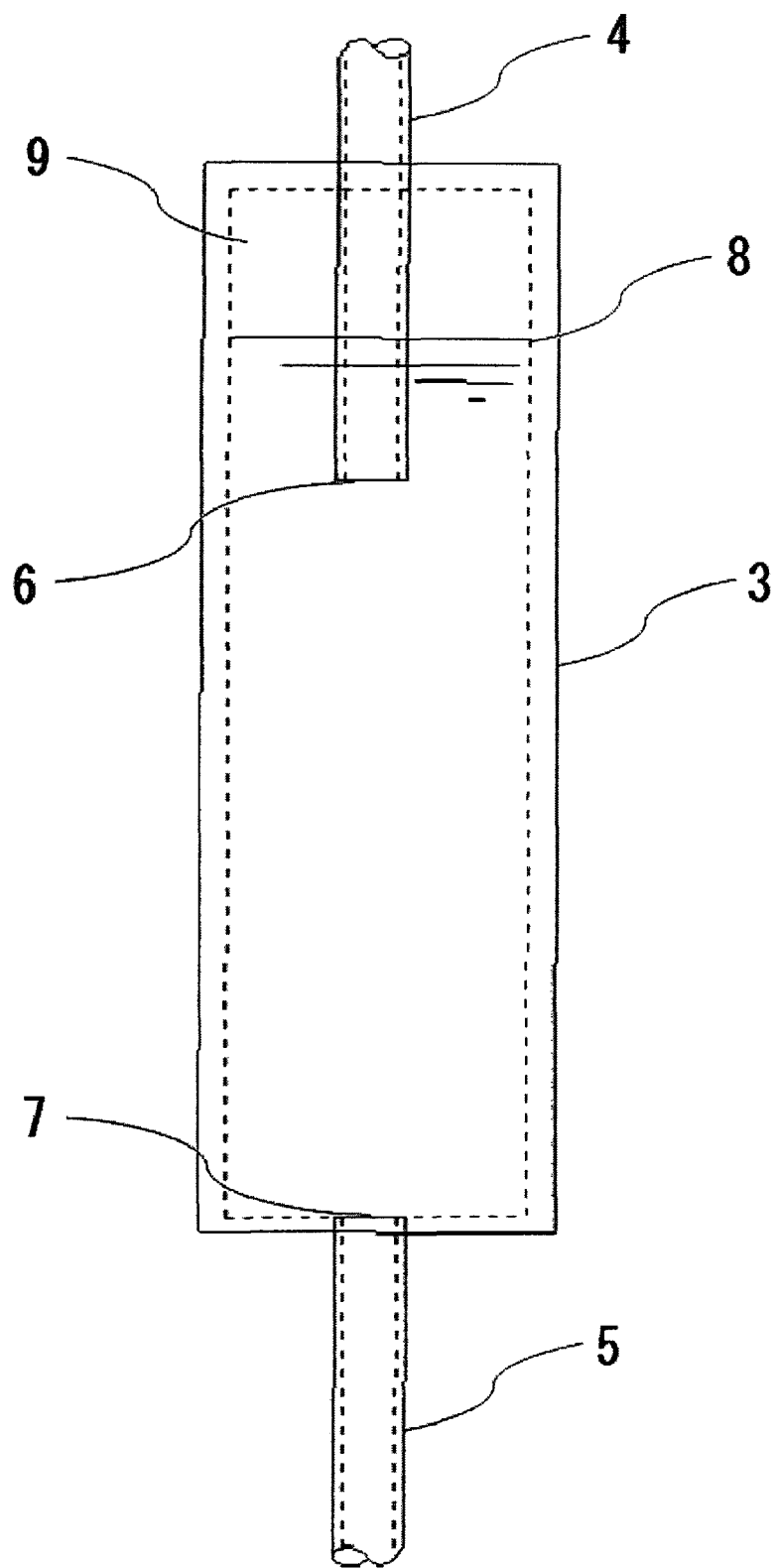
FIG. 3 is an explanatory schematic view of the device shown in FIG. 2.

As shown in FIG. 3, the debubbling mechanism 1 is filled with a liquid material in such a state that a space 9 is formed in the interior of the debubbling mechanism 3 in an upper portion thereof. In the arrangement shown in FIG. 3, a discharge port 6 of the first tube 4 is immersed in the liquid material and is located below a liquid surface 8 of the liquid material. The second tube 5 is communicated with a lower surface of the device body 2.

In the liquid material discharge device shown in FIG. 1, the first tube 4 is used in a state filled with the liquid material. During the use, if bubbles mixed in the liquid material are transported to a measuring section, the movement of a plunger cannot be precisely transmitted to the liquid material and the liquid material cannot be discharged with high accuracy. To avoid such a drawback, according to the present invention, the liquid material from the liquid material supply section passes through the interior of the debubbling mechanism body 3, which has a greater width than the first tube 4, and is then supplied to the measuring section. Therefore, even if bubbles are mixed in the liquid material, the bubbles are released to the upper space 9 within the debubbling mechanism body 3. More specifically, the bubbles released inside the debubbling mechanism body 3 drift upward due to the presence of a freely movable space within the debubbling mechanism body 3 and then disappear at the gas—liquid interface so as to assimilate into the space 9. Thus, the shorter the distance between the first tube discharge port 6 and the liquid surface 8, the shorter is a time until the bubbles released inside the debubbling mechanism body 3 disappear.

Further, the liquid material is delivered to the device body 2 through the second tube 5 communicating with the lower surface of the debubbling mechanism body 3. In this connection, the distance between the lower surface of the debubbling mechanism body 3, i.e., a suction port 7 at a distal end of the second tube 5, and the first tube discharge port 6 is set to be so long that a time required for the liquid material discharged from the first tube discharge port 6 to reach the suction port 7 at the distal end of the second tube 5 is sufficiently longer than the time until the bubbles released inside the debubbling mechanism body 3 disappear.

Respective positions of the first tube discharge port 6 and the suction port 7 with respect to the debubbling mechanism body 3 are not limited to the arrangement shown in FIG. 3. Some examples of other usable arrangements are shown in FIGS. 4 and 5.

Figure 4:
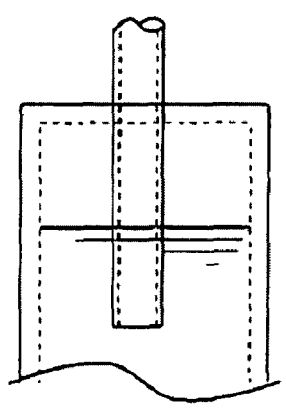
FIG. 4 is an enlarged explanatory view showing modifications of a first tube of the debubbling mechanism shown in FIG. 2.
Figure 4:
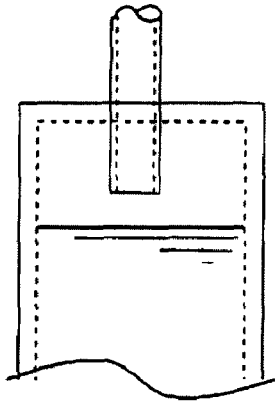
Figure 4:
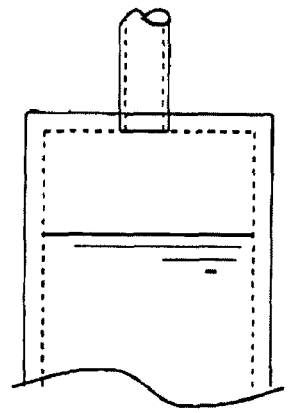
Figure 4:
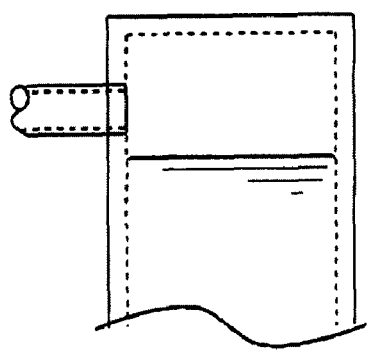
Figure 4:
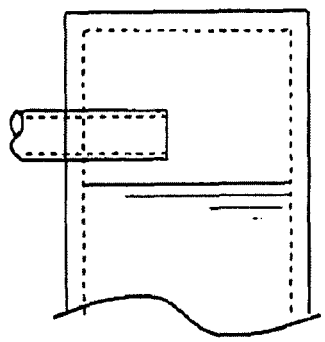
Figure 4:
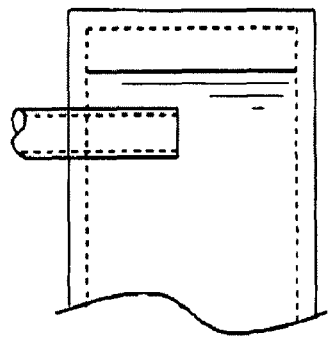
Figure 5:
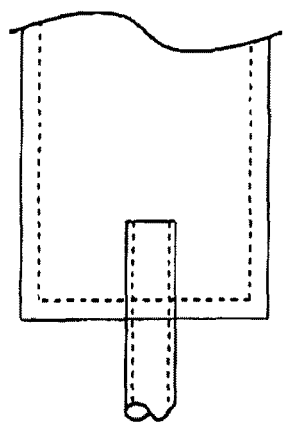
FIG. 5 is an enlarged explanatory view showing modifications of a second tube of the debubbling mechanism shown in FIG. 2.
Figure 5:
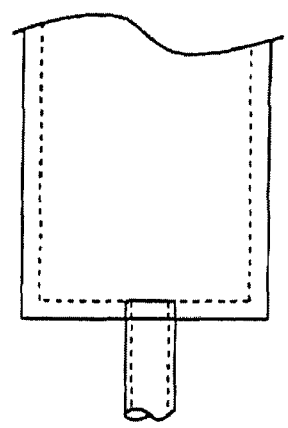
Figure 5:
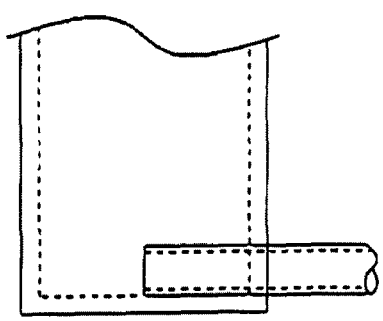
Figure 5:
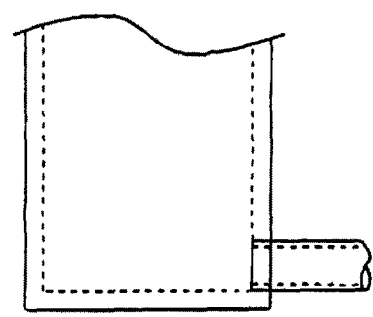
Figure 5:
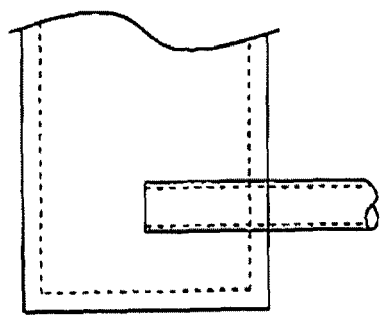
Figure 5:
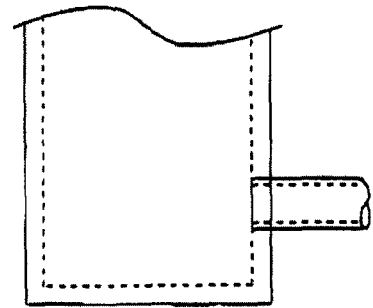

FIG. 4 shows some examples of the position at which the first tube discharge port 6 can be located with respect to the debubbling mechanism body 3, and FIG. 5 shows some examples of the position at which the second tube suction port 7 can be located with respect to the debubbling mechanism body 3.

In FIG. 4(*a*), the distal end of the first tube 4 is located at the same position as in FIG. 3, while in FIGS. 4(*b*) and 4(*c*), the first tube discharge port 6 is not immersed in the liquid material filled inside the debubbling mechanism body 3. In the arrangements shown in FIGS. 4(*b*) and 4(*c*), when the liquid material is discharged from the discharge port 6 of the first tube 4 toward the liquid material filled inside the debubbling mechanism body 3, the liquid material passes through a gas-phase space, though it is a slight distance. This causes a risk that bubbles are generated there. For that reason, the tube 4 is preferably extended to the interior of the body 3 such that the discharge port 6 is not exposed to the space 9. Further, the arrangement of the discharge port 6 being vertically located at an upper level raises a problem that, if the tube 4 is extended to the interior of the boy 3 through a larger distance, a longer time is required until the released bubbles disappear. In a preferred embodiment, therefore, the discharge port 6 of the first tube 4 is formed to locate in an inner side wall of the body 3.

FIGS. 4(*d*), 4(*e*) and 4(*f*) show arrangements in which the first tube 4 is communicated with a side surface of the debubbling mechanism body 3. In FIGS. 4(*d*) and 4(*e*), the first tube discharge port 6 is not immersed in the liquid material filled inside the debubbling mechanism body 3 as in FIGS. 4(*b*) and 4(*c*). On the other hand, in FIG. 4(*f*), the first tube discharge port 6 is immersed in the liquid material filled inside the debubbling mechanism body 3. In FIG. 4(*f*), only the liquid material and the space 9 are present above the first tube discharge port 6, and a body of the first tube 4 is not present above the discharge port 6 unlike FIG. 4(*a*). Accordingly, the arrangement of FIG. 4(*f*) is preferable in that there is no obstruction against upward movements of the bubbles.

In FIG. 5(*b*), a distal end of the second tube 5 is located at the same position as in FIG. 3, while in FIG. 5(*a*), the second tube 5 is extended to the interior of the debubbling mechanism body 3 such that the second tube suction port 7 is immersed in the liquid material filled inside the debubbling mechanism body 3. More specifically, in FIG. 5(*a*), the second tube suction port 7 is located at a position above a bottom surface of the debubbling mechanism body 3. When unwanted materials mixed in the liquid material reside near the bottom surface of the debubbling mechanism body 3 or they are deposited on the bottom surface, the arrangement of FIG. 5(*a*) is preferable in preventing those unwanted materials from being transported to the device body 2 through the second tube 5.

FIGS. 5(*c*), 5(*d*), 5(*e*) and 5(*f*) show the arrangements in which the second tube 5 is communicated with the side surface of the debubbling mechanism body 3. More specifically, in FIGS. 5(*c*) and 5(*d*), the second tube 5 is disposed to extend along the bottom surface of the debubbling mechanism body 3. In FIGS. 5(*e*) and 5(*f*), the second tube 5 is disposed above the bottom surface of the debubbling mechanism body 3 such that, as in FIG. 5(*a*), the second tube suction port 7 is located above the bottom surface of the debubbling mechanism body 3.

Figure 6:
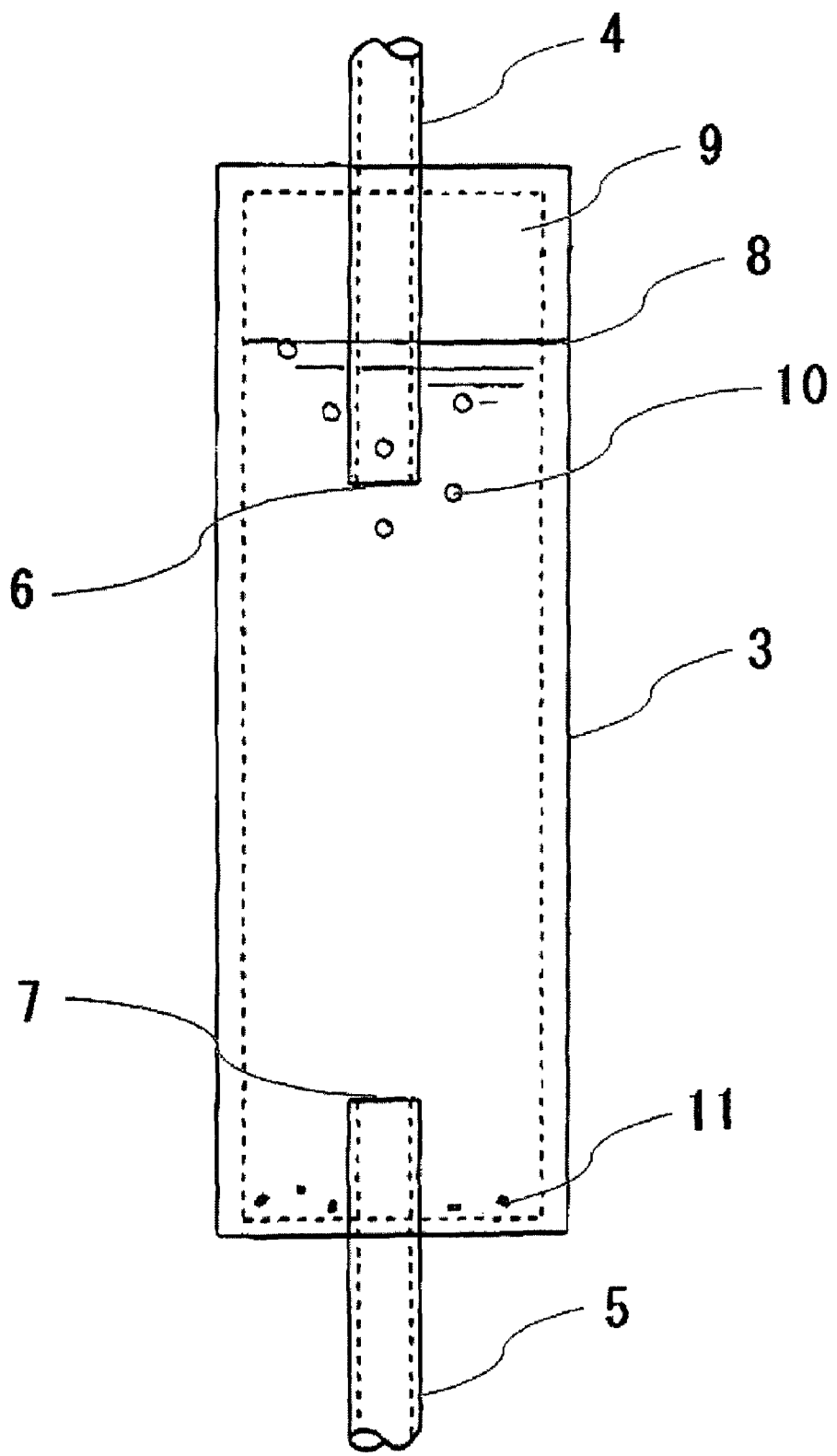
FIG. 6 is an explanatory view of the debubbling mechanism, the view showing, in more detail, one of the modifications shown in FIGS. 3 and 4.

FIG. 6 shows the debubbling mechanism having the arrangement of the first tube 4, which is shown in FIG. 4(*a*), and the arrangement of the second tube 5, which is shown in FIG. 5(*a*).

Even if bubbles 10 are mixed in the liquid material supplied through the first tube 4, the bubbles 10 drift upward toward the liquid surface 8 and then disappear so as to assimilate into the space 9.

Some unwanted materials 11 deposited on the bottom surface of the debubbling mechanism body 3 and other unwanted materials 11 floating near the bottom surface of the debubbling mechanism body 3 are positioned away from the second tube suction port 7 and are prevented from being sucked through the second tube suction port 7 and from being supplied to the device body 2 through the second tube 5.

Additionally, the debubbling mechanism body 3 is preferably made of a transparent material, such as glass or hard resin, from the viewpoint of allowing an operator to easily confirm, for example, the surface position of the liquid material filled in the body 3 and the situation of the mixed bubbles.

Further, the debubbling mechanism body 3 preferably includes a means for adjusting the surface position of the liquid material in the debubbling mechanism body 3. That means is provided, for example, as a communication means 80 for making the interior and the exterior of the debubbling mechanism body 3 communicate with each other such that an amount of air in the space 9 within the debubbling mechanism body 3 is adjusted and hence the surface position of the liquid material is adjusted. For the purpose of adjusting the amount of air in the space 9, the communication means 80 needs to be located above the debubbling mechanism body 3 to ensure communication with the space 9. Preferably, the communication means 80 is disposed at an upper end of the debubbling mechanism body 3.

The means for elevating or lowering the liquid surface within the debubbling mechanism body 3 is not limited to the above-described one. For example, in a state where a measuring section 33 including a plunger 51 inserted therein and the debubbling mechanism body 3 are communicated with each other and the interior and the exterior of the debubbling mechanism body 3 are also communicated with each other, it is possible to elevate the liquid surface by advancing the plunger 51 so as to move the liquid material in the second tube 5 in the upstream direction and to lower the liquid surface by retracting the plunger 51 so as to move the liquid material in the second tube 5 in the downstream direction. On that occasion, preferably, the liquid material is kept from being supplied to the debubbling mechanism body 3 by limiting the movement of the first tube 4, such as by cutting off the communication between the liquid material supply section and the debubbling mechanism body 3.

As an alternative, the height of the liquid surface within the debubbling mechanism body 3 can also be adjusted through control of a flow rate of the liquid material by providing, e.g., a throttling member in the second tube 5 and adjusting the cross-sectional area of the flow path formed therein.

Further, preferably, when the plunger 51 is retracted to suck the liquid material into the measuring section 33 in discharge work, the liquid level within the debubbling mechanism body 3 will not lower down to the suction port of the second tube 5. The reason resides in that, if the liquid surface lowers to such an extent as making the second tube suction port 7 exposed, the second tube 5 comes into a state faced to the space 9, thus caussing a risk that air in the space 9 may enter the second tube 5 and may reside as bubbles in the second tube 5. Because the second tube 5 has a narrower width than the debubbling mechanism body 3, it is difficult to discharge the bubbles once they enter the second tube 5.

When the liquid surface lowers with the retraction of the plunger 51, the liquid material is supplied from the first tube 4. This increases a difficulty in discharging the bubbles residing in the second tube 5. When the liquid material is moved with further progress of the discharge work, the bubbles are moved to the measuring section 33, whereby normal discharge of the liquid material is impeded.

Preferably, the volume of the debubbling mechanism body 3 is set to be greater than that of the measuring section 33 such that the liquid surface within the debubbling mechanism body 3 will not lower down to the second tube suction port 7 even when the plunger 51 is retracted through a maximum distance.

Details of the present invention will be described below in connection with embodiments, but the present invention is in no way restricted by the following embodiments.

Embodiment 1

<<Overall Structure>>

Figure 7:
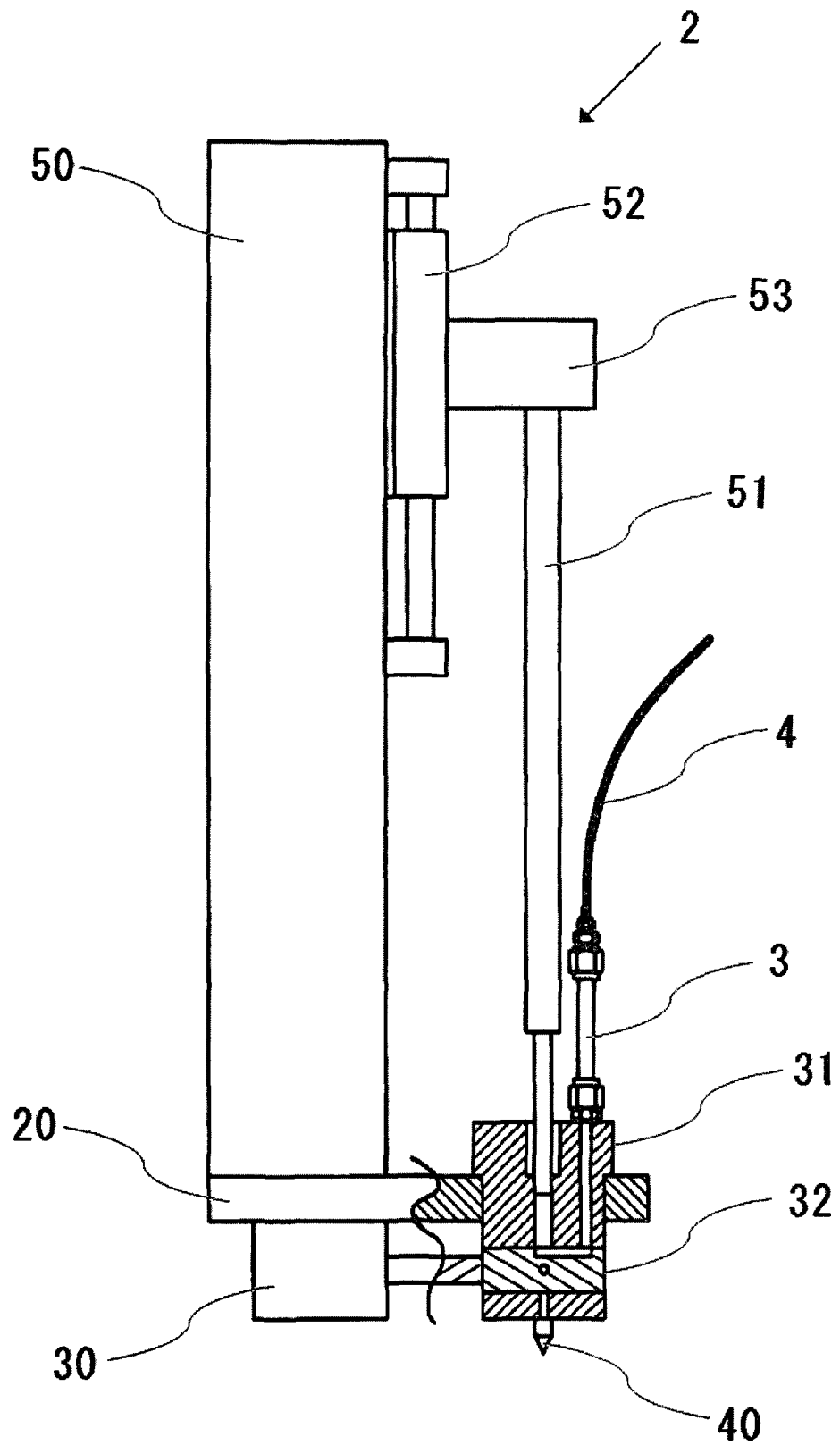
FIG. 7 is a schematic view, sectioned in a principal part, of the device described as Embodiment 1.

The liquid material discharge device of the present invention comprises, as shown in FIGS. 1 and 7, a base 20, a plunger driving section 50 fixed to the base 20, a slider 52 capable of sliding with driving of the plunger driving section 50, a plunger support 53 fixed to the slider 52, the plunger 51 fixed to the plunger support 53, a valve driving section 30 disposed on a lower surface of the base 20, a valve 31 operated with driving of the valve driving section 30, a valve member 32 which is inserted in a hole formed to extend laterally to be opened at a side surface of the valve 31 and which is rotatable in the hole, a nozzle 40 disposed below the nozzle 31, the debubbling mechanism 1 disposed above the valve 31, and the first tube 4 for supplying the liquid material to the debubbling mechanism 1.

Figure 8:
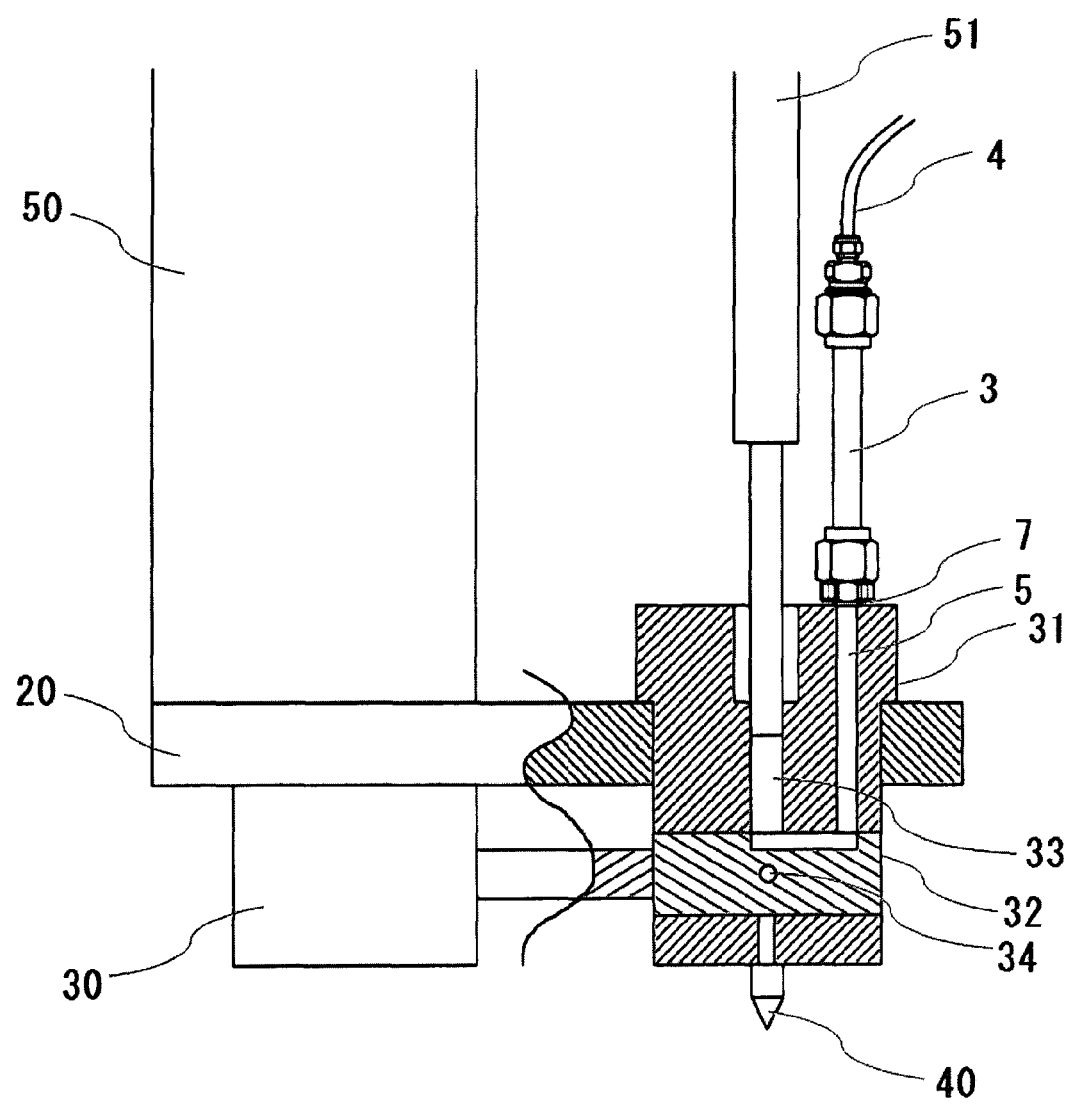
FIG. 8 is a schematic view, enlarged and sectioned in a principal part, of the device shown in FIG. 7.

As shown in FIG. 8, the valve 31 has two through holes, i.e., a through hole that forms the measuring section 33 at the center of the valve 31, and a through hole that forms the second flow path 5 at a position near a side edge of the valve 31.

The valve member 32 has a valve-member through hole 34 penetrating the valve member in the diametrical direction, which forms a flow path for making the nozzle 40 and the measuring section 33 communicate with each other.

Further, the valve member 32 has a groove which is formed in a peripheral surface of the valve member 32 in an orthogonal relation to the valve-member through hole 34 and which is extended in the lengthwise direction of the valve member 32. When the valve member 32 is inserted to the above-mentioned hole formed in the valve 31, the groove constitutes a flow path for making the debubbling mechanism 1 and the measuring section 33 communicate with each other in cooperation with an inner wall surface of the above-mentioned hole.

<<Liquid Material Discharge Work>>

Work for discharging the liquid material by using the liquid material discharge device having the above-described construction will be described below.

After operating the valve driving section 30 to shift the valve member 32 within the valve 31 to the position where the debubbling mechanism 1 and the measuring section 33 are communicated with each other, the plunger driving section 50 is operated to retract the plunger 51, whereby the liquid material filled in the debubbling mechanism body 3 is caused to flow into the second tube 5 through the second tube suction port 7 and the liquid material is then filled in the measuring section 33. On that occasion, the position of the liquid surface 8 is moved toward the second flow path side and is then moved toward the first flow path side. Also, the liquid material is supplied to the debubbling mechanism body 3 through the first tube 4 from the first tube discharge port 6 of the first tube 4.

Next, after operating the valve driving section 30 to shift the valve member 32 within the valve 31 to the position where the measuring section 33 and the nozzle 40 are communicated with each other, the plunger 51 is advanced to discharge the liquid material from the discharge port of the nozzle 40. At that time, by advancing the plunger 13 in units of a prescribed distance, the liquid material can be discharged successively in a certain fixed amount from the nozzle 40.

Also, by operating the plunger driving section 50 at a high speed to advance the plunger 51 through a prescribed distance at a high speed, the liquid material stored in the measuring section 33 can be caused to fly in the form of droplets from the discharge port of the nozzle 40.

The liquid material may be all discharged by one operation of advancing the plunger 51, or may be discharged plural times in a divided manner by plural operations of advancing the plunger 51. In other words, the liquid material may be sucked into the measuring section 33 per discharge, or may be sucked into the measuring section 33 after plural times of discharges.

In a discharge routine for sucking the liquid material into the measuring section 33 per discharge as described above, preferably, a distal end of the plunger 51 is always started to retract from a certain fixed position and started to advance from a certain fixed position so that the operation of the plunger 51 is kept uniform in each discharge.

In a discharge routine for sucking the liquid material into the measuring section 33 after plural times of discharges as described above, since the number of times the valve member 32 is operated is reduced in comparison with the routine for operating the valve member 32 per discharge, the life of the valve member 32 can be prolonged.

Embodiment 2

Figure 9:
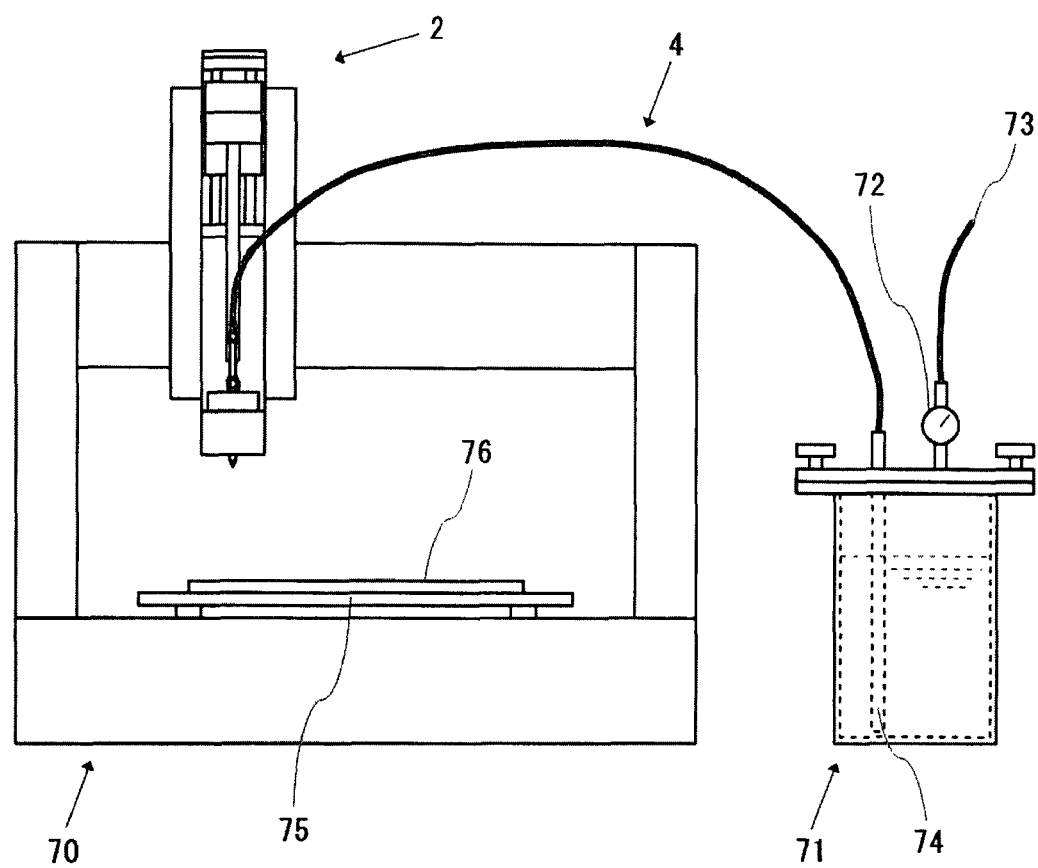
FIG. 9 is a schematic view showing the construction of a device according to Embodiment 2.

FIG. 9 shows an example in which the discharge device including the debubbling mechanism is mounted to a 3-axis robot.

A 3-axis robot 70 is movable in the directions of the X- and Z-axes by a Z-axis direction moving means capable of moving the discharge device 2 in the vertical direction and by an X-axis direction moving means. By moving a table 75 in the Y-axis direction, the nozzle 40 and the table 75 can be relatively moved.

The discharge device 2 and a liquid material reservoir 71 containing the liquid material therein are communicated with each other through the first tube 4 and a liquid feed pipe 74. An air pressure supplied through an under-pressure feed tube 74 is regulated by a regulator 72 and is applied to the interior of the liquid material reservoir 71.

Embodiment 3

Figure 10:
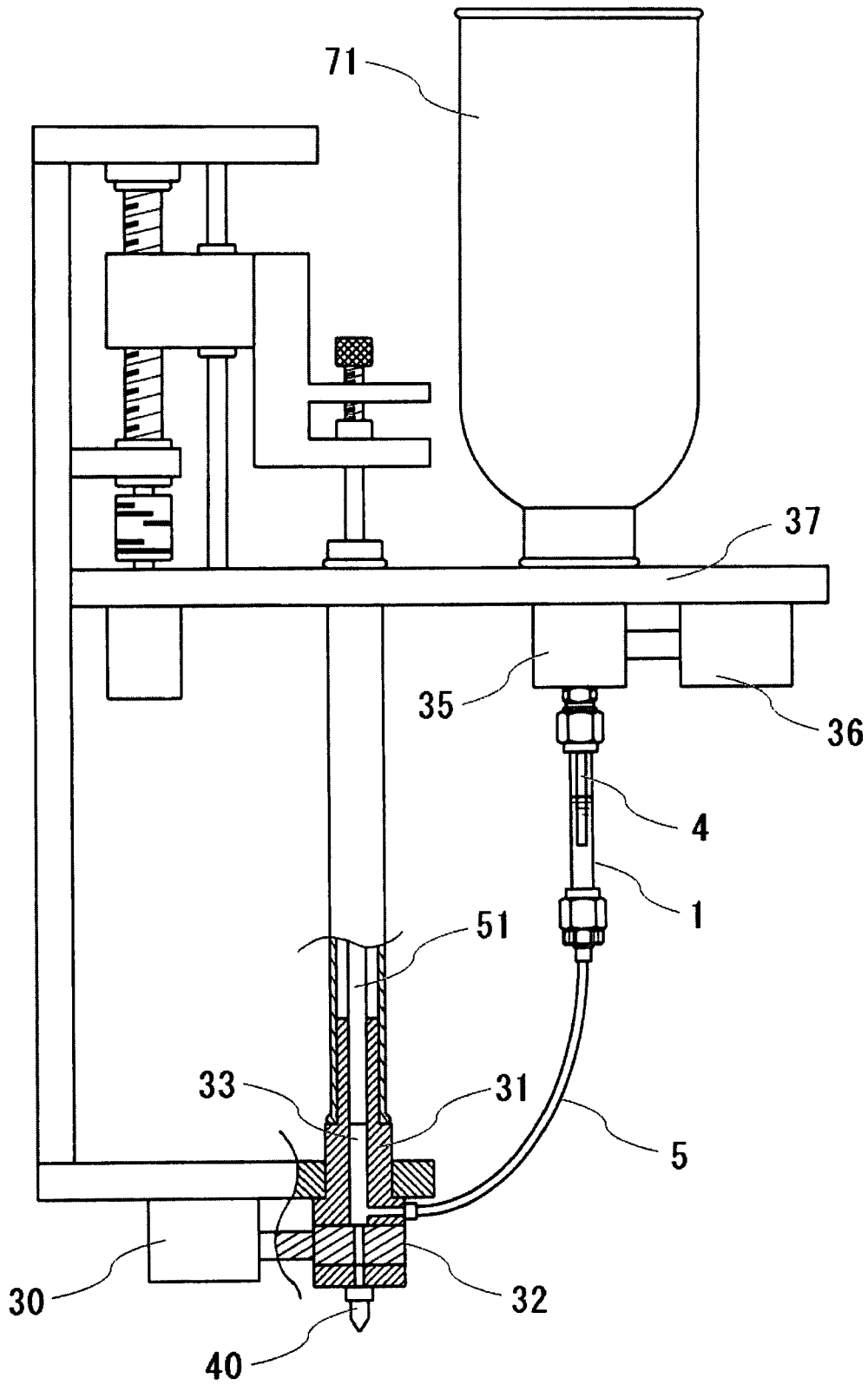
FIG. 10 is a schematic side view, partly sectioned, of a device according to Embodiment 3.

In a discharge device according to Embodiment 3, as shown in FIG. 10, a liquid material reservoir 71 is disposed on a body of the discharge device. The liquid material reservoir 71 is supported by an intermediate plate 37, and a second valve 35 and a valve driving section for driving the second valve are fixed to the underside of the intermediate plate 37.

The reservoir 71 is communicated with the valve 35, and the valve 35 is communicated with a debubbling mechanism 1 which is adjacently disposed below the valve 35. The valve 35 serves to selectively establish or cut off a flow path between the reservoir 71 and the debubbling mechanism 1.

A lower portion of the debubbling mechanism 1 is communicated with a second tube 5, and the second tube 5 is communicated with a valve 31. The valve 31 has a through hole, which constitutes a measuring section 33, and a lateral hole which is formed to be opened at a side surface of the valve 31 and which is communicated with the second tube 5. In the valve 31, a valve member 32 is operated by a valve driving section 30 to selectively establish or cut off a flow path between the measuring section 33 and a nozzle 40.

A discharge operation is performed as follows. The valve 35 is opened to communicate the reservoir 71 and the debubbling mechanism 1 with each other, and the valve 31 is closed to cut off the communication between the measuring section 33 and the nozzle 40. In such a state, a plunger 51 is retracted to suck the liquid material into the measuring section 33. Thereafter, the valve 35 is closed to cut off the communication between the reservoir 71 and the debubbling mechanism 1, and the valve 31 is opened to communicate the measuring section 33 and the nozzle 40 with each other. In such a state, the plunger 51 is advanced to discharge the liquid material from the nozzle 40.

The following points are similarly applied to this Embodiment 3 as in Embodiment 1. (1) By advancing the plunger 51 through a prescribed distance at a high speed, the liquid material stored in the measuring section 33 can be caused to fly in the form of droplets from the discharge port of the nozzle 40. (2) The liquid material may be all discharged by one operation of advancing the plunger 51, or may be discharged plural times in a divided manner by plural operations of advancing the plunger 51. In other words, the liquid material may be sucked into the measuring section 33 per discharge, or may be sucked into the measuring section 33 after plural times of discharges. (3) In a discharge routine for sucking the liquid material into the measuring section 33 per discharge as described above, preferably, a distal end of the plunger 51 is always started to retract from a certain fixed position and started to advance from a certain fixed position so that the operation of the plunger 51 is kept uniform in each discharge.

The debubbling mechanism according to this embodiment is constructed as shown in FIG. 2. In FIG. 2, a first tube 4 is a flexible tube, and a debubbling mechanism body 3 is made of a transparent tube. The transparent tube constituting the debubbling mechanism body 3 has a greater diameter than the first tube 4, and it is required to have transparence at such a level as allowing the operator to confirm at least the surface position of the liquid material within the debubbling mechanism body and the situation of mixed bubbles.

In one practical example of the connection between the first tube 4 and the debubbling mechanism body 3, the first tube 4 is extended to the interior of the debubbling mechanism body 3 by a desired length. An end of the first tube 4 constitutes a first tube discharge port 6. Such an arrangement can be similarly applied to the connection between the second tube 6 and the debubbling mechanism body 3.

The first tube discharge port 6 is preferably located above the liquid surface as shown in FIGS. 4(b) and 4(c). The reason resides in that, if remaining bubbles are dragged with the movement of the liquid material to enter the second tube 5, it is difficult to discharge those bubbles, thus resulting in a risk that the liquid material cannot be normally discharged. In the arrangements shown in FIGS. 4(b) and 4(c), upward movements of the bubbles tending to elevate within the debubbling mechanism body 3 are prevented from being, for example, caught between the first tube 4 and the inner surface of the debubbling mechanism body 3, or from being attached to near the distal end of the first tube 4. As a result, the bubbles can be avoided from remaining in the liquid material.

Figure 11:
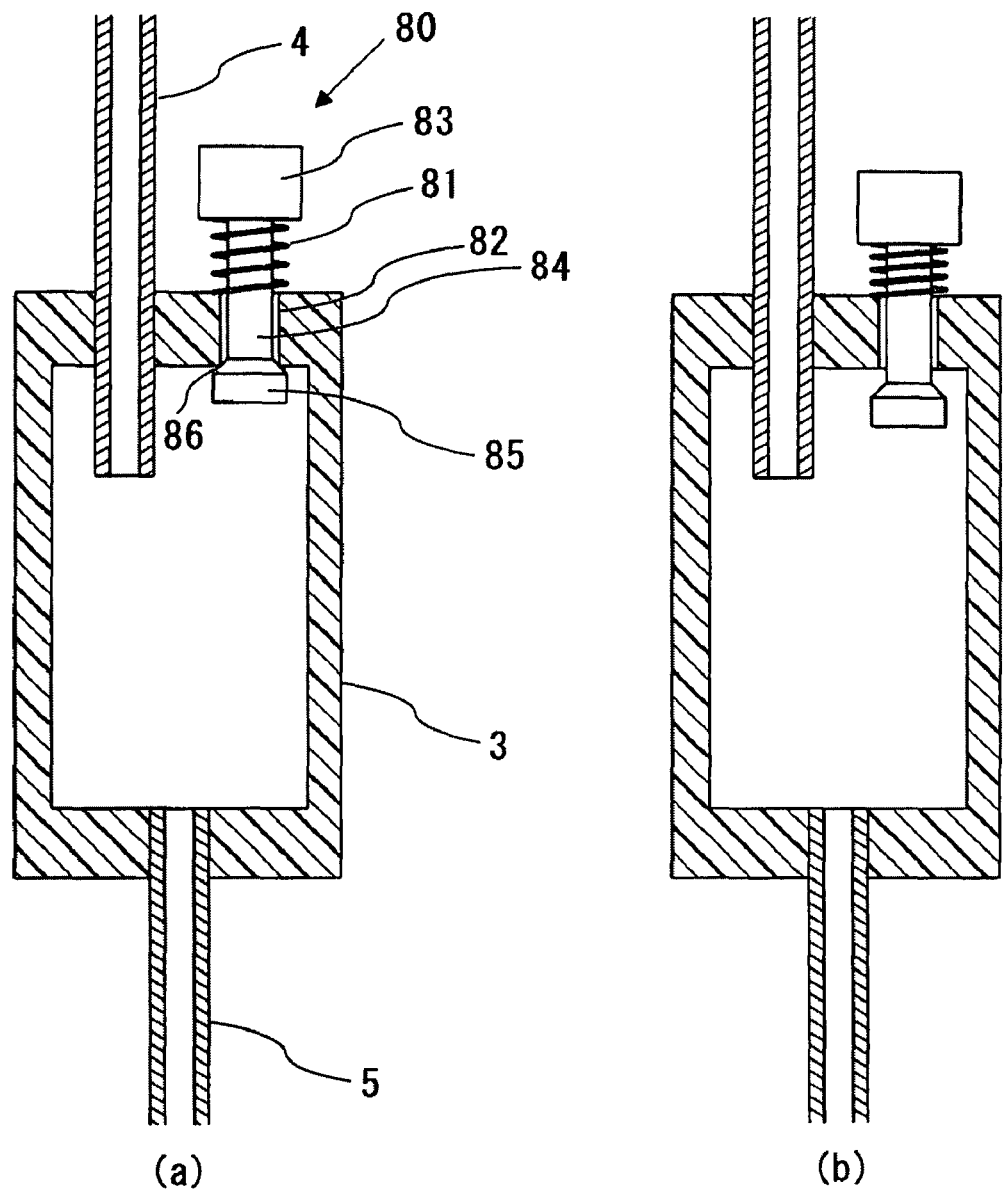
FIG. 11 is a side sectional view for explaining a communication means for making the interior and the exterior of a body of the debubbling mechanism communicate with each other.

In this embodiment, by providing a communication means for making the interior and the exterior of the debubbling mechanism body 3 communicate with each other, an amount of air in the space 9 within the debubbling mechanism body 3 can be adjusted and hence the surface position of the liquid material can be adjusted. The communication means 80 in this embodiment is constructed as shown in FIG. 11. In FIG. 11, the first flow path 4 is connected to a top portion of the debubbling mechanism body 3, and the communication means 80 is disposed in a side-by-side relation thereto. The second flow path 5 is connected to a bottom portion of the debubbling mechanism body 3.

The construction of the communication means 80 will be described in detail.

A through hole 82 for communicating the exterior and the interior is formed in the top portion of the debubbling mechanism body 3. A rod-like shaft portion 84 having a smaller diameter than the through hole 82 is inserted in the through hole 82.

A pressing portion 83 is connected to an exterior-side end of the shaft portion 84, and a valve member 85 is connected to an opposite-side (interior-side) end of the shaft portion 84.

The pressing portion 83 has a greater width than the through hole 82, and a spring 81 is disposed between a lower surface of the pressing portion 83 and a top surface of the debubbling mechanism body 3 in the vicinity of the through hole 82. The spring 81 serves to exert a force upon the pressing portion 83 so as to move it in a direction away from the debubbling mechanism body 3.

The valve member 85 also has a greater diameter than the through hole 82, and an upper surface of the valve member 85 is sloped from its outer periphery toward its end connected to the shaft portion 84. The valve member 85 acts as a valve with the sloped upper surface of the valve member 85 coming into contact with or separating from an opening of the through hole 82. On that occasion, an edge of the opening of the through hole 82 acts as a valve seat 86.

When the communication means 80 is in a standby state, as shown in FIG. 11(a), the valve member 85 is caused to move upward by the action of the force exerted from the spring 81, whereby the valve member and the valve seat are contacted with each other. In other words, the communication between the interior and the exterior of the debubbling mechanism body 3 is in a cutoff state. When the height of the liquid surface is adjusted by using the communication means 80, the pressing portion 83 is pressed downward to separate the valve member 85 from the valve seat 86, as shown in FIG. 11(b), thus making the interior and the exterior of the debubbling mechanism body 3 communicate with each other through the through hole 82.

The communication means 80 can adjust the height of the liquid surface within the debubbling mechanism body 3 in a manner of elevating or lowering the liquid surface.

The liquid surface is elevated by communicating the interior and the exterior of the debubbling mechanism body 3 with each other and then cutting off the communication between them in a state where the second flow path side is shut off from the exterior. In the construction of FIG. 8, for example, in a state of the plunger being inserted into the measuring section 33, the valve 31 is shifted to the position where the second flow path 5 and the measuring section 33 are communicated with each other, thus shutting off the second flow path side from the exterior. Thereafter, the interior and the exterior of the debubbling mechanism body 3 are communicated with each other by using the communication means 80 of the debubbling mechanism body 3. Upon reaching the desired position of the liquid surface, the communication with the exterior through the communication means 80 is cut off.

The liquid surface is lowered by communicating the interior and the exterior of the debubbling mechanism body 3 with each other and then cutting off the communication between them in a state where the second flow path side is communicated with the exterior. In the construction of FIG. 8, for example, the valve 31 is shifted to the position where the second flow path 5 and the through hole are communicated with each other, and the plunger is withdrawn from the through hole of the measuring section 33, thus communicating the second flow path side with the exterior. Thereafter, the interior and the exterior of the debubbling mechanism body 3 are communicated with each other by using the communication means 80 of the debubbling mechanism body 3. Upon reaching the desired position of the liquid surface, the communication with the exterior through the communication means 80 is cut off.

When the height of the liquid surface is adjusted, the liquid material in the first flow path is preferably kept from being supplied to the debubbling mechanism body 3 in any case of elevating or lowering the liquid surface. Such a measure can be realized, for example, by cutting off the communication between the liquid material supply section and the debubbling mechanism body 3.

INDUSTRIAL APPLICABILITY

The device of the present invention can be generally applied, by way of example, to a liquid crystal dripping step in manufacturing a liquid crystal panel. The liquid crystal dripping step means a step of supplying a liquid crystal into an area surrounded by sealing, which is formed on a liquid crystal substrate. In that step, the liquid crystal is supplied by using the liquid material discharge device of the present invention.

The invention claimed is:

1. A liquid material discharge device comprising:
a liquid material supply section for supplying the liquid material to be discharged;
a measuring section having a measuring hole and a plunger sliding on an inner wall surface of the measuring hole to suck the liquid material into the measuring hole and to discharge the liquid material;
a plunger driving section for moving the plunger;
a discharge section having a discharge port for discharging the liquid material;
a valve section for changing over communication between the liquid material supply section and the measuring section and communication between the measuring section and the discharge section, the valve section includes a block having the measuring hole therein;
a valve driving section for operating the valve section; and
a debubbling mechanism provided in a flow path running from the liquid material supply section to the measuring section,
wherein the debubbling mechanism includes a first flow path communicating with the liquid material supply section side, a second flow path communicating with the measuring section side, and a body for making the first flow path and the second flow path communicate with each other, the body having a greater width than the first flow path, and a discharge port of the first flow path is located above a suction port of the second flow path, and
wherein the debubbling mechanism includes communication mechanism for selectively establishing or cutting off communication between the interior and the exterior of a debubbling mechanism body, thus enabling a liquid surface position within the body to be adjusted.

2. A liquid material discharge device comprising:
a liquid material supply section for supplying the liquid material to be discharged;
a measuring section having a measuring hole and a plunger sliding on an inner wall surface of the measuring hole to suck the liquid material into the measuring hole and to discharge the liquid material;
a plunger driving section for moving the plunger;
a discharge section having a discharge port for discharging the liquid material;
a valve section for changing over communication between the liquid material supply section and the measuring section and communication between the measuring section and the discharge section, the valve section includes a block having the measuring hole therein;
a valve driving section for operating the valve section; and
a debubbling mechanism provided in a flow path running from the liquid material supply section to the measuring section,
wherein the debubbling mechanism includes a first flow path communicating with the liquid material supply section side, a second flow path communicating with the measuring section side, and a body for making the first flow path and the second flow path communicate with each other, the body having a greater width than the first flow path, and a discharge port of the first flow path is located above a suction port of the second flow path, and
wherein a volume of the debubbling mechanism body is set to be greater than that of the measuring section.

3. A liquid material discharge device comprising:
a liquid material supply section for supplying the liquid material to be discharged;
a measuring section having a measuring hole and a plunger sliding on an inner wall surface of the measuring hole to suck the liquid material into the measuring hole and to discharge the liquid material;
a plunger driving section for moving the plunger;
a discharge section having a discharge port for discharging the liquid material;
a valve section for changing over communication between the liquid material supply section and the measuring section and communication between the measuring section and the discharge section, the valve section includes a block having the measuring hole therein;
a valve driving section for operating the valve section; and
a debubbling mechanism provided in a flow path running from the liquid material supply section to the measuring section,
wherein the debubbling mechanism includes a first flow path communicating with the liquid material supply section side, a second flow path communicating with the measuring section side, and a body for making the first flow path and the second flow path communicate with each other, the body having a greater width than the first flow path, and a discharge port of the first flow path is located above a suction port of the second flow path, and
wherein the plunger is retracted in a state of the liquid material supply section and the measuring section being communicated with each other to such an extent that a liquid surface of the liquid material within the debubbling mechanism body does not lower down to the suction port of the second flow path, thereby sucking the liquid material into the measuring hole, and the plunger is advanced in a state of the measuring section and the discharge section being communicated with each other, thereby discharging the liquid material.

4. The liquid material discharge device according to claim 2, wherein the debubbling mechanism includes communication mechanism for selectively establishing or cutting off communication between the interior and the exterior of a debubbling mechanism body, thus enabling a liquid surface position within the body to be adjusted.

5. The liquid material discharge device according claim 2, wherein the plunger is retracted in a state of the liquid material supply section and the measuring section being communicated with each other to such an extent that a liquid surface of the liquid material within the debubbling mechanism body does not lower down to the suction port of the second flow path, thereby sucking the liquid material into the measuring hole, and the plunger is advanced in a state of the measuring section and the discharge section being communicated with each other, thereby discharging the liquid material.

* * * * *